US006186738B1

(12) United States Patent
Junker

(10) Patent No.: US 6,186,738 B1
(45) Date of Patent: Feb. 13, 2001

(54) DOCKING SYSTEM AND METHOD FOR ALIGNING AND ATTACHING A MOBILE LOADING/UNLOADING UNIT TO A MACHNE

(75) Inventor: Erwin Junker, Nordrach (DE)

(73) Assignee: Erwin Junker Maschinenfabrik GmbH, Nordrach (DE)

( * ) Notice: Under 35 U.S.C. 154(b), the term of this patent shall be extended for 0 days.

(21) Appl. No.: 09/528,923

(22) Filed: Mar. 20, 2000

Related U.S. Application Data

(62) Division of application No. 09/269,959, filed as application No. PCT/EP97/05658 on Oct. 15, 1997.

(30) Foreign Application Priority Data

Oct. 3, 1996 (DE) .............................................. 196 42 7630

(51) Int. Cl.$^7$ .................................................. B23Q 7/14
(52) U.S. Cl. ........................................... 414/809; 414/401
(58) Field of Search .................................... 414/401, 402, 414/396, 584, 809

(56) References Cited

U.S. PATENT DOCUMENTS

| | | | |
|---|---|---|---|
| 3,650,419 | * 3/1972 | Upshur et al. ......................... | 414/343 |
| 4,016,989 | * 4/1977 | Furnari ............................... | 414/401 X |
| 4,120,411 | * 10/1978 | Johnson ............................. | 414/401 X |
| 4,728,242 | * 3/1988 | Erlandsson .......................... | 414/401 |
| 4,773,811 | * 9/1988 | Wasner ............................... | 414/401 |
| 5,144,369 | * 9/1992 | Benedict et al. .................. | 414/401 X |
| 5,224,812 | * 7/1993 | Oslin et al. .......................... | 414/401 |
| 5,388,947 | * 2/1995 | Ancel et al. ......................... | 414/401 |
| 5,441,376 | * 8/1995 | Napierkowski et al. ............ | 414/401 |
| 5,454,682 | * 10/1995 | Alexander ............................ | 414/401 |

* cited by examiner

Primary Examiner—Robert P. Olszewski
Assistant Examiner—Gerald J. O'Connor
(74) Attorney, Agent, or Firm—Jordan and Hamburg LLP

(57) ABSTRACT

A system for loading and unloading a machine tool provides a loading unit having a loading unit chassis. Two fixing devices each have a fixing piece disposed on the machine tool and having a receiving section, and a mating piece mounted on the loading unit chassis and having a configuration for engagement with the receiving section. The fixing devices are disposed vertically displaced from one another permitting simultaneous engagement. A bearing structure has rollers and supports the loading unit chassis on a surface. The bearing structure is vertically displaceable relative to the loading unit chassis to permit lifting and lowering of the loading unit chassis for engagement and disengagement of the first and second fixing devices. In an embodiment the receiving sections are slots arranged in a bottom of each of the fixing pieces and the configuration of the mating pieces is an upwardly directed engagement member. A clamping unit is disposed above at least one of the fixing pieces when the engagement members engage the slots and has a clamping element extendable to engage the top side of one of the fixing pieces to vertically support the loading unit. above the surface. In another embodiment, the receiving sections of the fixing pieces are slots in a top of each of the fixing pieces and the configuration in the mating pieces includes downwardly directed engagement members engageable with respective ones of the slots by downward displacement of the loading unit chassis.

14 Claims, 5 Drawing Sheets

ID N DOCKING SYSTEM AND METHOD FOR ALIGNING AND ATTACHING A MOBILE LOADING/UNLOADING UNIT TO A MACHNE

This application is a division of Ser. No. 09/269,959, filed May 5, 1999, which is a 371 of PCT/EP97/05658, filed Oct. 15, 1997.

BACKGROUND OF THE INVENTION

The invention relates to a device for loading and unloading machine tools.

Hitherto, it has been known to use immobile loading and unloading devices, e.g. gantry loading systems/robots or special loading systems which are specifically designed for one machine tool or one machining operation. This is particularly complex and expensive when the machining times for workpieces lie in a range which means that a separate loading unit for the workpieces is not loaded to its full capacity.

U.S. patent Ser. No. 5,364,219 describes a device which is used in a clean room or in vacuum techniques in the production of semiconductors. In this case, a first vacuum chamber, which is accommodated in a treatment unit, is coupled to a second vacuum chamber which is accommodated in a movable case. After the first vacuum chamber and the second vacuum chamber are coupled together, a lock produces a connection between the two vacuum chambers. The case can be moved on rails inside a clean room. The aim is to operate a vacuum chamber without surrounding air being able to penetrate into the vacuum. For this purpose, it is absolutely necessary for the vacuum chambers to be sealed with respect to the ambient air.

SUMMARY OF THE INVENTION

The present invention has as an object design and provision of a device for loading and unloading machine tools in such a way that the device can be used efficiently.

This object is achieved by means of A device for loading and unloading machine tools, wherein a loading unit, which can be moved on rollers over a factory shop floor, has at least one fixing device for coupling to a machine tool, of which one part is arranged on the machine tool and another part, which interacts therewith, is arranged on the loading unit, and the loading unit has provisions for decoupling from the machine tool after loading and unloading.

Briefly stated, the present invention provides a device for loading and unloading machine tools. A movable loading unit can be coupled to a machine tool by at least one fixing device, of which one part is arranged on the machine tool and another part, which interacts therewith, is arranged on the loading unit, and the loading unit can be decoupled again from the machine tool after loading or unloading.

In accordance with these and other objects of the invention, there is provided a loading unit for coupling to a machine tool wherein two fixing devices each include a fixing piece mounted on a machine tool having a receiving section and a mating piece which is mounted to a loading unit chassis and is engageable with the receiving section. The loading unit chassis has rollers for supporting the loading unit chassis. A bearing structure assembly movably mounts the rollers to the loading unit chassis such that the loading unit chassis is vertically displaceable relative to the rollers to permit engagement of the fixing devices.

According to a feature of the invention, there is further provided slots arranged on a bottom side of each of the fixing pieces and upwardly directed webs are arranged on the mating pieces for effecting engagement with the slots, and a clamping unit attached to the loading unit having an extendable clamping element engageable with a top side of one of the fixing pieces for supporting the loading unit when the rollers are moved vertically toward the loading chassis after the fixing devices are engaged.

The present invention further includes a feature wherein slots are arranged on a top side of each of the fixing pieces and upwardly directed webs are provided on the mating pieces for engagement in the slots.

Still a further feature of the present invention provides for manual movement of the loading unit.

Yet a further feature of the present invention provides for loading unit including a mechanism for automatic movement for operation as a floor conveyor vehicle.

According to the invention, the loading unit may also be used for a plurality of machine tools, since the fixing device allows the loading unit to be coupled to any desired machine tool. Workpieces are thus transported to various machine tools. This is advantageous in particular if workpieces are only partially machined on one machine tool. A further advantage is that when high numbers of workpieces are being machined, the machine tool can be loaded automatically, without ruling out the possibility of loading the machine with individual workpieces by hand and, in this period, using the loading unit at a different machine.

BRIEF DESCRIPTION OF THE DRAWINGS

The invention is explained in more detail below with reference to exemplary embodiments illustrated in the drawing, in which.

DETAILED DESCRIPTION

Figure 5:
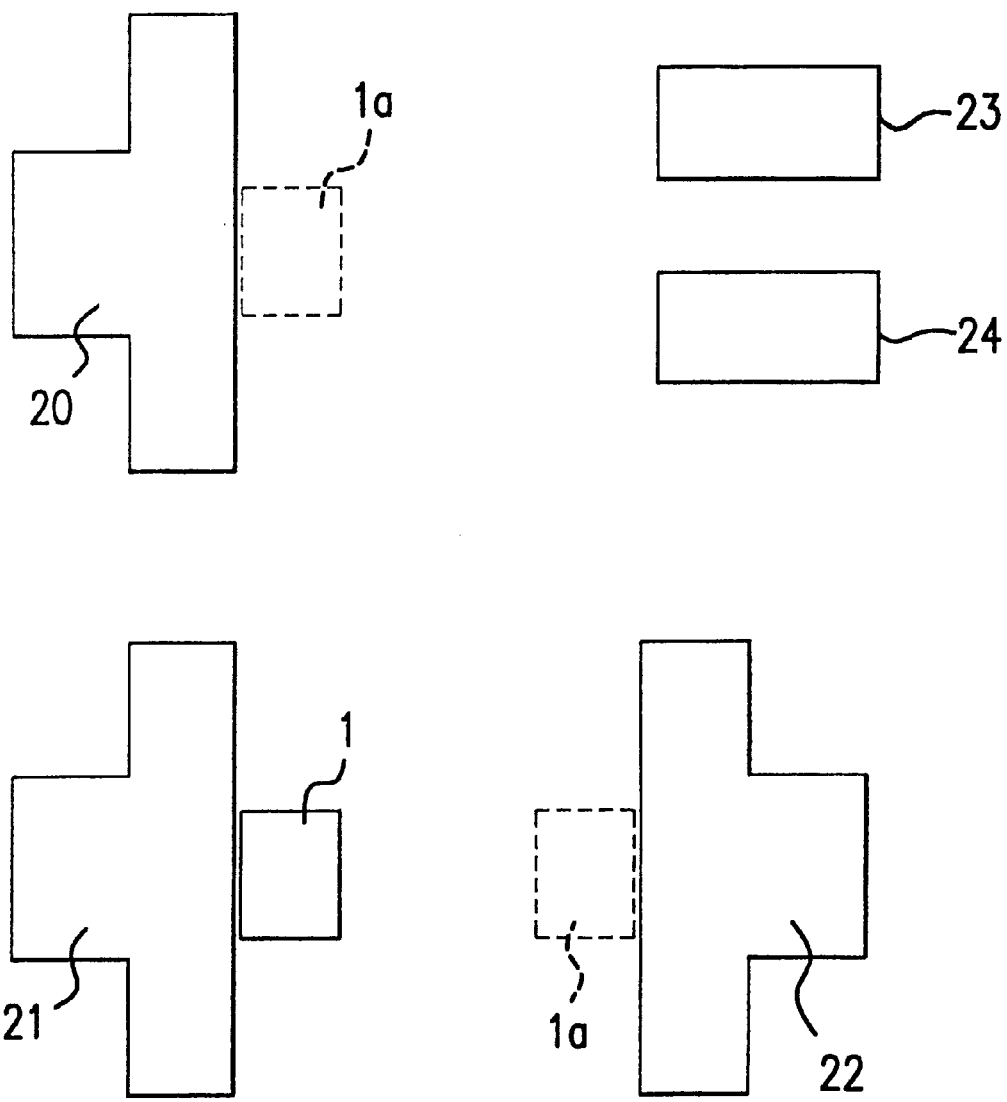
FIG. 5 diagrammatically shows how the loading and unloading device is used at a plurality of machines.

In accordance with FIG. 5, a loading unit 1 is designed as an independent loading system and can be coupled to various machine tools 20, 21 and 22 which are able to fulfill identical or different machining operations.

Figure 1:
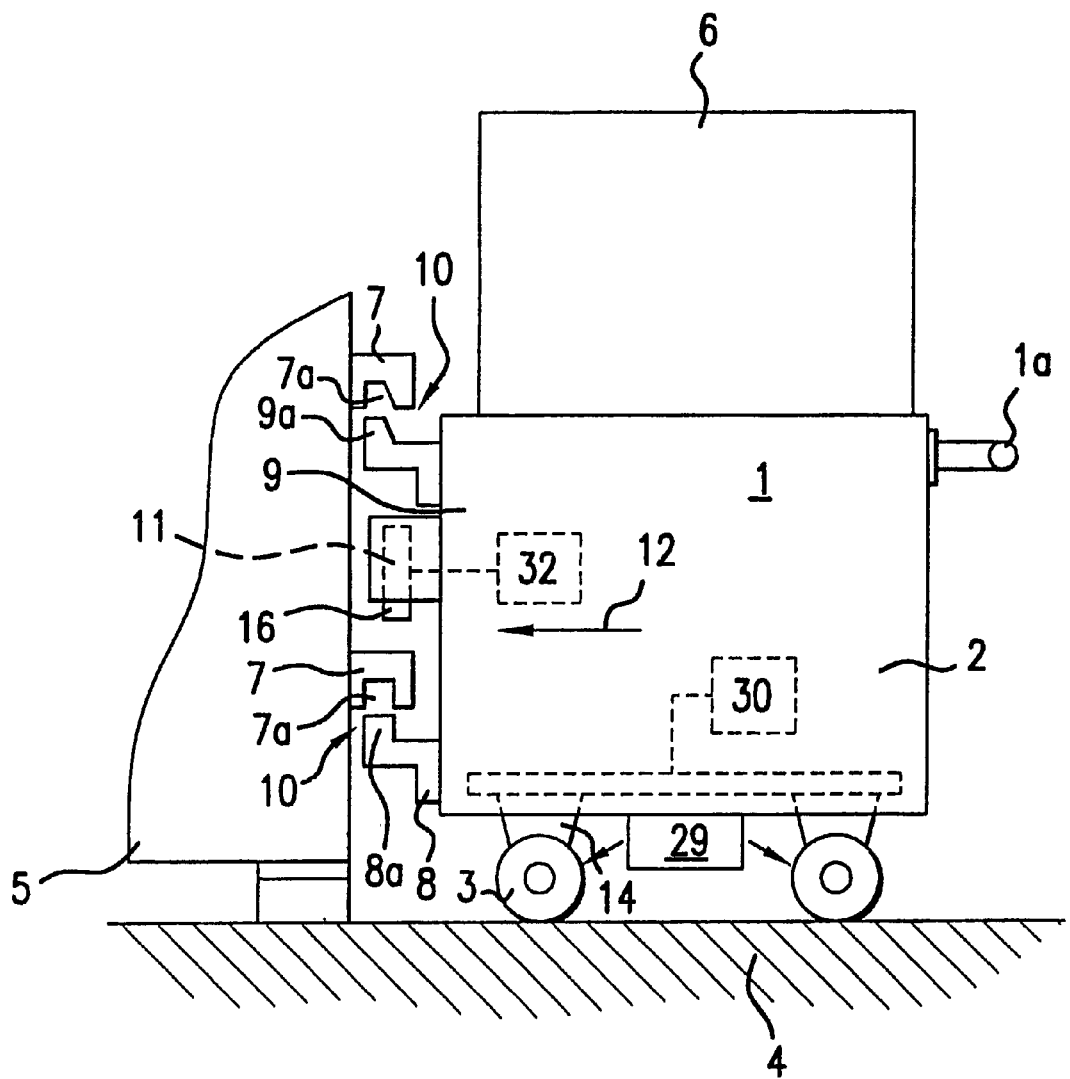
FIG. 1 shows a side view of a loading and unloading device in a decoupled position in front of a machine tool with first and second linear actuators 30 and 32 and roller drive mechanism 29 shown in block diagram schematic form.

Referring to FIG. 1, the loading unit 1 comprises a basic frame, or loading unit chassis 2, which is transported on rollers 3, over a factory shop floor 4, to an exemplary machine tool 5. The loading unit 1 may be transported to the machine tools 5 manually using a handle la or is designed as floor conveyor vehicle having roller drive mechanism 29 which is shown in block diagram form. A loading device 6 is mounted on the loading unit chassis 2.

On a front area of the machine tool 5, there are fixing pieces 7 to which the loading unit 1 securely fixable. Mating pieces 8, 9 are mounted on the loading unit chassis 2 of the loading unit 1. Together with the mating pieces 8 or 9, the fixing pieces 7 form fixing devices 10. The fixing pieces 7 have slots 7a at a bottom side thereof for insertion of an upwardly directed webs, or engagement members 8a or 9a, disposed on respective ones of the mating pieces 8 and 9. The mating piece 9 is designed as a fixed bearing unit, and the mating piece 8 is designed as a movable bearing unit.

To clamp the loading unit 1 in the fixing devices 10, a clamping unit 11 which is attached to the loading unit 1 is provided. Arrow 12 indicates the direction the loading unit 1 is moved to be situated in front of the machine tool 5.

Figure 2:
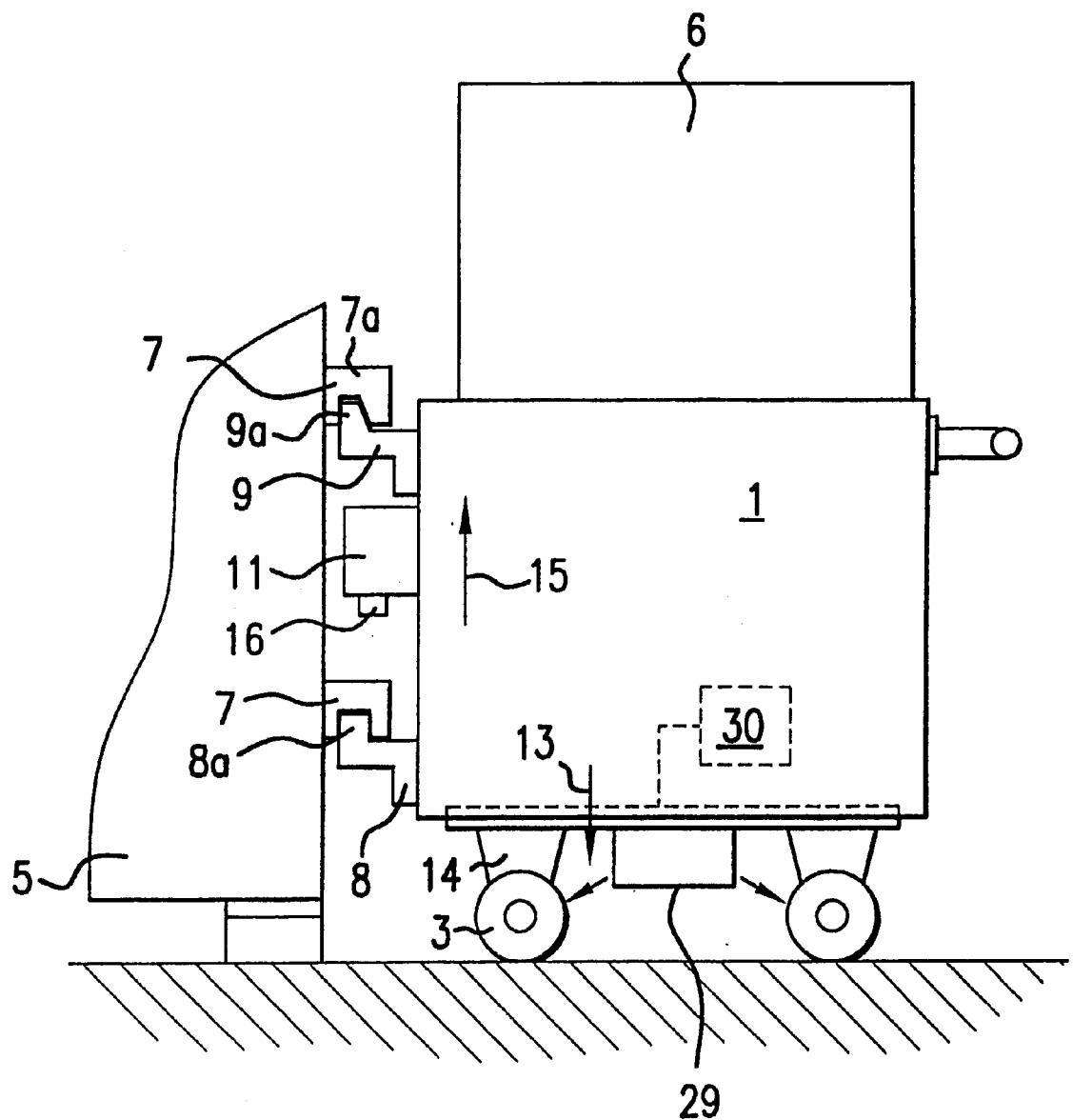
FIG. 2 shows a side view of the loading and unloading device of FIG. 1 after it is raised with the second linear actuator 32 omitted for clarity.

Referring to FIG. 2, once situated in front of the machine tool 5 with the engagement members 7a and 9a substantially aligned with the slots 7a, the loading unit 1 is raised vertically in the direction of the arrow 15 by a first linear actuator 30, shown in block diagram form, acting on the bearing structure 14 to vertically extend the bearing structure 14 in the direction of the arrow 13.

Figure 3:
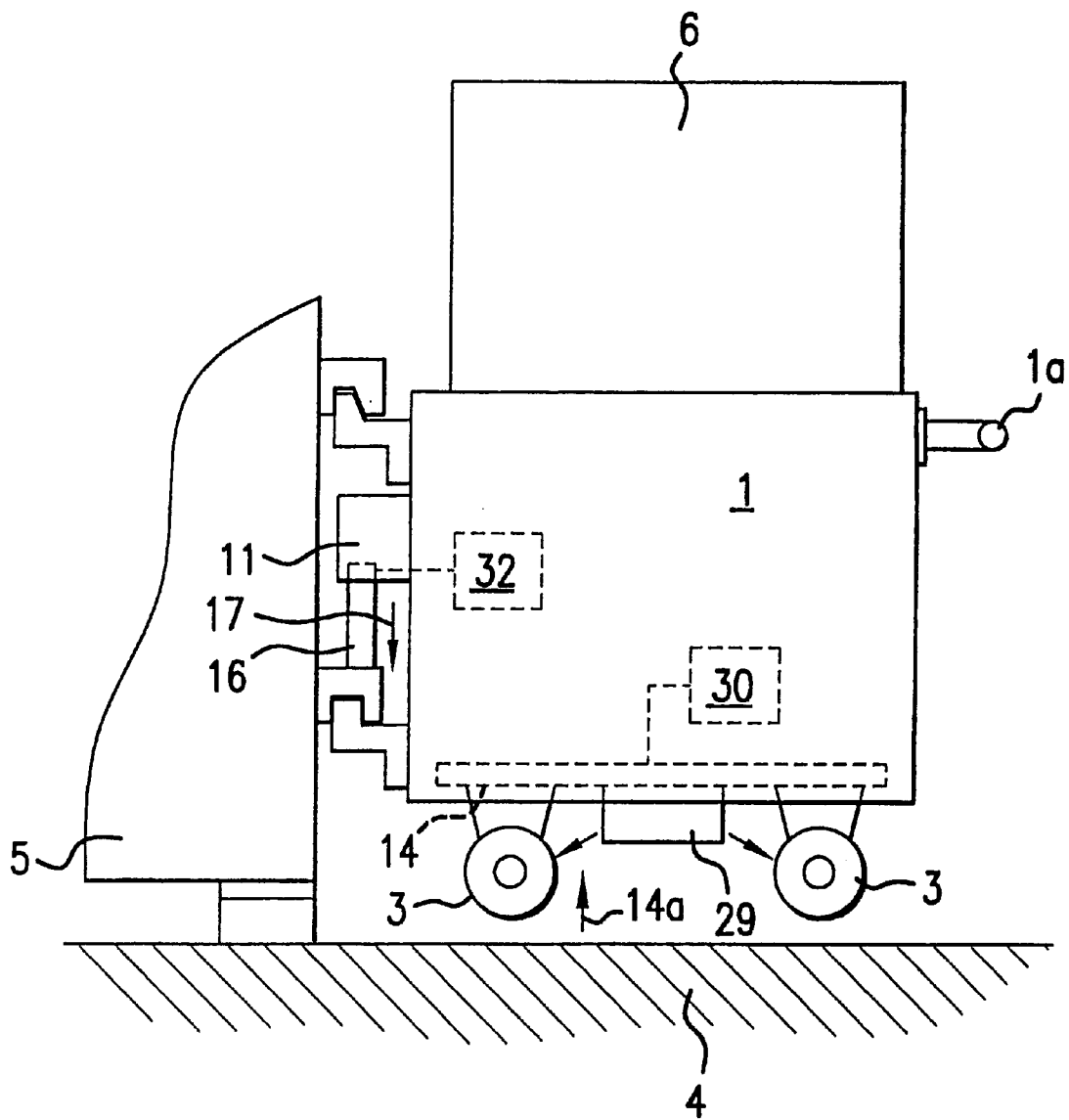
FIG. 3 shows a side view of the loading and unloading device of FIG. 1 after it is coupled to the machine tool.

Referring to FIG. 3, after the loading unit 1 is raised vertically sufficiently far for the fixing devices 10 to close in a form-fitting manner, the loading unit 1 is next securely fixed to the machine tool 5. The clamping unit 11 serves to couple the loading unit 1 to the machine tool 5 in a fixed position. The clamping unit 11 has a clamping element 16 which is extended, for example in the direction of the arrow 17, by a second linear actuator and supports itself on the top side of the bottom fixing piece 7 thereby securing the loading unit 1 to the machine 5. After the loading unit 1 is fixed in the coupled position, the rollers 3 are lifted off the factory shop floor 4 in the direction of the arrow 14a by the bearing structure 14 being vertically lifted by the first linear actuator 30, so that the entire loading unit 1 is then suspended only from the machine tool 5. The loading unit 1 is released from the machine tool 5 by execution of the above actions in the reverse order.

Figure 4:
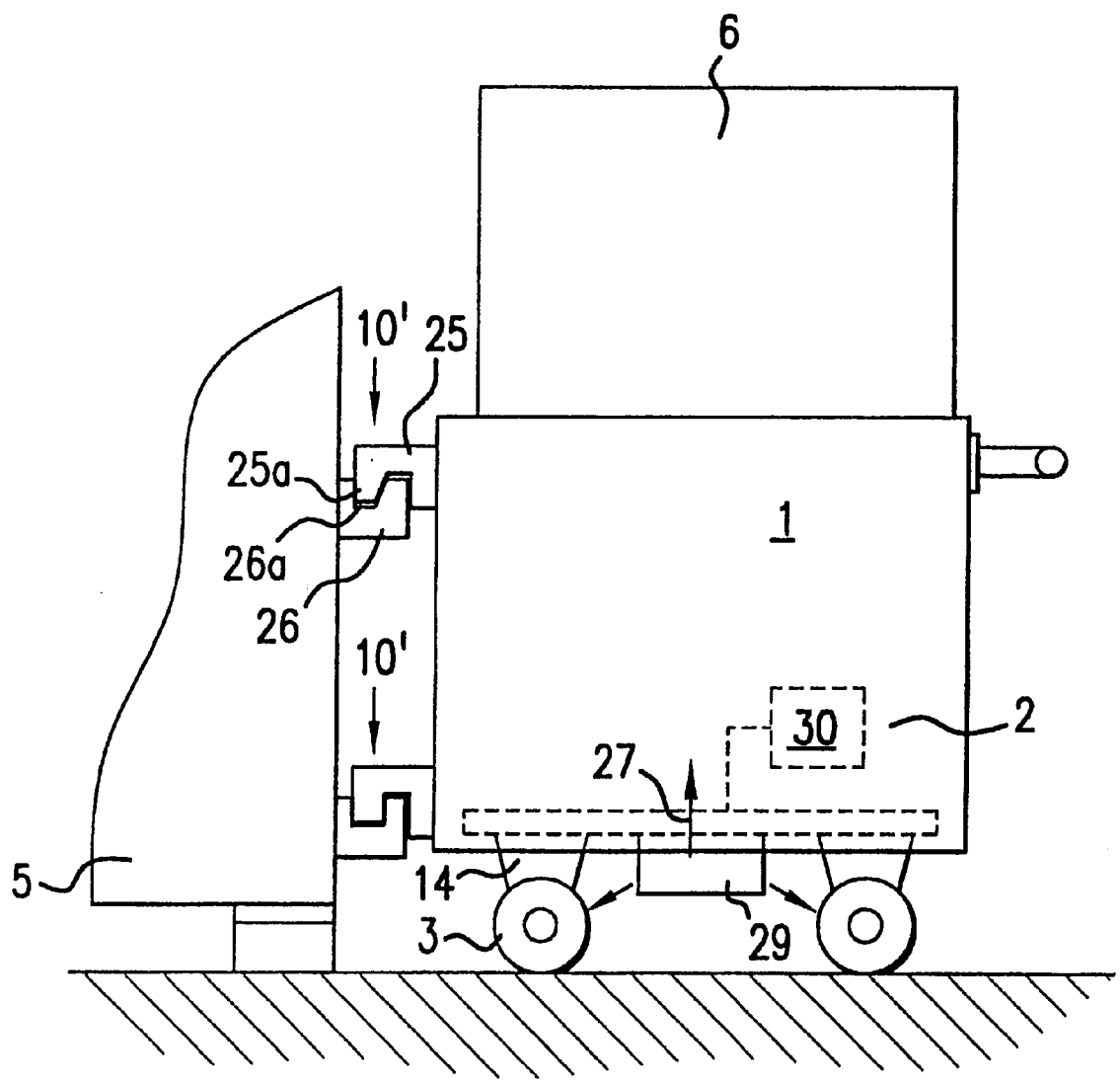
FIG. 4 shows a side view of another embodiment of the loading and unloading device with the first linear actuator 30 and roller drive mechanism 29 shown in block diagram schematic form.

Referring to FIG. 4, a further embodiment for fixing the loading unit 1 to a machine tool S is shown. In this embodiment, the procedure may be similar to that for the system in accordance with FIGS. 1 to 3. Fixing devices 10' comprise fixing pieces 26 which are attached to the machine tool 5 and have upwardly directed slots 26a, which interact with downwardly directed engagement members 25a on mating pieces 25 which are attached to the loading unit 1. The loading unit 1 is raised in the direction of arrow 27 by the first linear actuator extending the bearing structure 14 and rollers 3 to position the engagement members 25a above the slots 26a. The loading unit 1 is then lowered by the first linear actuator 30 so the engagement members 25a come into engagement with the slots 26a. Once the engagement has taken place, by retracting the bearing structure 14 and rollers, the loading unit 1 is suspended from the machine tool 5. In this case, it is possible to dispense with a clamping unit 11, shown in FIGS. 1 to 3, since the system is fixed securely merely by the weight of the loading unit 1.

Referring to FIG. 5, the loading unit 1 is usable in conjunction with a plurality of machine tools 20, 21, 22. In the position illustrated, the loading unit 1 is mounted on the machine tool 21 which can be loaded and unloaded. It is possible either for the loading unit 1 simply to load and unload the machine 21, or, after machining has taken place, for finished workpieces to be placed on an intermediate repository which is mounted on the loading unit 1 and for the entire loading unit 1 to be moved to the machine 20 or 22 at positions la either by the machine operator or as a floor conveyor vehicle by operation of the roller drive mechanism 29.

In this way, it is possible, for example, to achieve a production system in which a plurality of machine tools can be loaded and unloaded using a single loading unit 1. In the manufacturing route, it is possible to provide a cell solution for a plurality of machine tools, with a single, cost-effective loading unit 1 being used for loading and unloading all the machine tools. The manufacturing cell also includes a location for storage magazines for blanks 23 and finished parts 24.

As an alternative to the loading unit, it is also possible to couple a unit which has a different task to the machine. In this case, instead of the loading device 6 a unit with a different function is mounted on the same loading unit chassis 2.

What is claimed is:

1. A method for engaging a loading unit with a machine supported on a floor surface, comprising the steps of:

providing a loading unit having rollers for supporting the loading unit on the floor surface which are vertically displaceable relative to the loading unit such that displacement of the rollers raises and lowers the loading unit;

providing, on a side of the machine, first and second fixing pieces that are vertically displaced from one another;

providing, on a side of the loading unit, first and second mating pieces that are vertically displaced from one another so as to be simultaneously respectively engageable and disengageable with the first and second fixing pieces to permit cantilevered support of the loading unit from the side of the machine tool;

vertically extending the rollers to elevate the loading unit relative the floor surface and effecting engagement of the first and second fixing pieces with the first and second mating pieces; and retracting the rollers upward while the first and second fixing pieces are engaged with the first and second mating pieces such that the rollers are removed from contact with the floor surface and the loading unit is supported off the floor by engagement of the first and second fixing pieces with the first and second mating pieces.

2. The method of claim 1 wherein:

the step of vertically extending the rollers includes extending the rollers to an extent that at least portions of the first and second mating pieces are at a higher level than at least portions of the first and second fixing pieces; and the step of effecting engagement of the first and second fixing pieces with the first and second mating pieces includes:

disposing the at least portions of the first and second mating pieces above at least portions of the first and second fixing pieces; and vertically retracting the rollers to lower the at least portions of the first and second mating pieces into engagement with the at least portions of the first and second fixing pieces.

3. The method of claim 2 wherein:

the at least portions of the first and second fixing pieces each include slots in a top of each of said fixing pieces; and the at least portions of the first and second mating pieces each include downwardly directed engagement members engageable with respective ones of said slots by the downward displacement of said loading unit.

4. The method of claim 1 further comprising:

providing a clamping unit disposed on said side of said loading unit at a position disposed above at least an upward facing portion of at least one of said first and second fixing pieces when engagement of the first and second fixing pieces with the first and second mating pieces is effected, said clamping unit having a clamping element extendable to engage the at least an upward facing portion of said at least one of said fixing pieces for providing vertical support;

the step of effecting engagement of the first and second fixing pieces with the first and second mating pieces includes:

disposing the at least portions of the first and second mating pieces below at least portions of the first and second fixing pieces; and the vertically extending the rollers including extending the rollers to raise the at least portions of the first and second mating pieces into engagement with the at least portions of the first and second fixing pieces; and extending the clamping element downward from said clamping unit to engage the at least an upward facing portion of said at least one of said fixing pieces to provide vertical support, in combination with lateral support provided by said first and second fixing devices, for supporting said loading unit above said floor surface when the step of retracting the rollers upward is effected.

5. The method of claim 4 wherein:

the at least portions of the first and second fixing pieces each include slots arranged in a bottom of each of said fixing pieces; and the at least portions of the first and second mating pieces each include an upwardly directed engagement member arranged on a top of said mating pieces.

6. A method for engaging a loading unit with a machine supported on a floor surface, comprising the steps of:

providing a loading unit having rollers for supporting the loading unit on the floor surface which are vertically displaceable relative to the loading unit such that displacement of the rollers raises and lowers the loading unit;

providing, on a side of the machine, first and second fixing pieces that are vertically displaced from one another;

providing, on a side of the loading unit, first and second mating pieces that are vertically displaced from one another so as to be simultaneously respectively engageable and disengageable with the first and second fixing pieces to permit cantilevered support of the loading unit from the side of the machine tool;

vertically extending the rollers to elevate the loading unit relative the floor surface to an extent that at least portions of the first and second mating pieces are at a higher level than at least portions of the first and second fixing pieces;

disposing the at least portions of the first and second mating pieces above at least portions of the first and second fixing pieces;

effecting engagement of the first and second fixing pieces with the first and second mating pieces by vertically retracting the rollers to lower the at least portions of the first and second mating pieces into engagement with the at least portions of the first and second fixing pieces; and retracting the rollers upward while the first and second fixing pieces are engaged with the first and second mating pieces such that the rollers are removed from contact with the floor surface and the loading unit is supported off the floor by engagement of the first and second fixing pieces with the first and second mating pieces.

7. The method of claim 6 wherein:

the at least portions of the first and second fixing pieces each include slots in a top of each of said fixing pieces; and the at least portions of the first and second mating pieces each include downwardly directed engagement members engageable with respective ones of said slots by the downward displacement of said loading unit.

8. A method for engaging a loading unit with a machine supported on a floor surface, comprising the steps of:

providing a loading unit having rollers for supporting the loading unit on the floor surface which are vertically displaceable relative to the loading unit such that displacement of the rollers raises and lowers the loading unit;

providing, on a side of the machine, first and second fixing pieces that are vertically displaced from one another;

providing, on a side of the loading unit, first and second mating pieces that are vertically displaced from one another so as to be simultaneously respectively engageable and disengageable with the first and second fixing pieces to permit cantilevered support of the loading unit from the side of the machine tool;

providing a clamping unit disposed on said side of said loading unit at a position disposed above at least an upward facing portion of at least one of said first and second fixing pieces when engagement of the first and second fixing pieces with the first and second mating pieces is effected, said clamping unit having a clamping element extendable to engage the at least an upward facing portion of said at least one of said fixing pieces for providing vertical support;

disposing the at least portions of the first and second mating pieces below at least portions of the first and second fixing pieces;

vertically extending the rollers to elevate the loading unit relative the floor surface and to raise the at least portions of the first and second mating pieces into engagement with the at least portions of the first and second fixing pieces;

extending the clamping element downward from said clamping unit to engage the at least an upward facing portion of said at least one of said fixing pieces to provide vertical support, in combination with lateral support provided by said first and second fixing devices, for supporting said loading unit above said floor surface when the rollers are retracted upward; and retracting the rollers upward while the first and second fixing pieces are engaged with the first and second mating pieces such that the rollers are removed from contact with the floor surface and the loading unit is supported off the floor by engagement of the first and second fixing pieces with the first and second mating pieces.

9. The method of claim 8 wherein:

the at least portions of the first and second fixing pieces each include slots arranged in a bottom of each of said fixing pieces; and the at least portions of the first and second mating pieces each include an upwardly directed engagement member arranged on a top of said mating pieces.

10. A method for engaging a loading unit with a machine supported on a floor surface, comprising the steps of:

providing a loading unit having rollers for supporting the loading unit on the floor surface which are vertically displaceable relative to the loading unit such that displacement of the rollers raises and lowers the loading unit;

providing, on a side of the machine, at least one fixing piece;

providing, on a side of the loading unit, at least one mating piece that is engageable and disengageable with the at least one fixing piece to permit support of the loading unit from the side of the machine tool;

vertically extending the rollers to elevate the loading unit relative the floor surface and effecting engagement of the at least one fixing piece with the at least one mating piece; and retracting the rollers upward while the at least one fixing piece is engaged with the at least one mating piece such that the rollers are removed from contact with the floor surface and the loading unit is supported off the floor by engagement of the at least one fixing piece with the at least one mating piece.

11. The method of claim 10 wherein:

the step of vertically extending the rollers includes extending the rollers to an extent that at least a portion of the at least one mating piece is at a higher level than at least a portion of the at least one fixing piece; and the step of effecting engagement of the at least one fixing piece with the at least one mating piece includes:

disposing the at least a portion of the at least one mating piece above at least a portion of the at least one fixing piece; and vertically retracting the rollers to lower the at least a portion of the at least one mating piece into engagement with the at least a portion of the at least one fixing piece.

12. The method of claim 11 wherein:

the at least a portion of the at least one fixing piece each includes a slot in a top of said at least one fixing piece; and the at least a portion of the at least one mating piece each includes a downwardly directed engagement member engageable with said slot by the downward displacement of said loading unit.

13. The method of claim 10 further comprising:

providing a clamping unit disposed on said side of said loading unit at a position disposed above at least an upward facing portion of said at least one fixing piece when engagement of the at least one fixing piece with the at least one mating piece is effected, said clamping unit having a clamping element extendable to engage the at least an upward facing portion of said at least one fixing piece for providing vertical support;

the step of effecting engagement of the at least one fixing piece with the at least one mating piece includes:

disposing the at least a portion of the at least one mating piece below at least a portion of the at least one fixing piece; and the vertically extending the rollers including extending the rollers to raise the at least a portion of the at least one mating piece into engagement with the at least a portion of the at least one fixing piece; and extending the clamping element downward from said clamping unit to engage the at least an upward facing portion of said at least one of said fixing piece to provide vertical support, in combination with lateral support provided by said at least one fixing devices, for supporting said loading unit above said floor surface when the step of retracting the rollers upward is effected.

14. The method of claim 13 wherein:

the at least a portion of the at least one fixing piece includes a slot arranged in a bottom of said at least one fixing piece; and the at least a portion of the at least one mating piece includes an upwardly directed engagement member arranged on a top of said mating piece.

* * * * *